United States Patent
Viturro et al.

(10) Patent No.: US 7,505,173 B2
(45) Date of Patent: Mar. 17, 2009

(54) SYSTEM AND METHOD FOR SPATIAL GRAY BALANCE CALIBRATION USING HYBRID SENSING SYSTEMS

(75) Inventors: R. Enrique Viturro, Rochester, NY (US); Lalit K. Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 645 days.

(21) Appl. No.: 11/170,928

(22) Filed: Jun. 30, 2005

(65) Prior Publication Data

US 2006/0285134 A1      Dec. 21, 2006

Related U.S. Application Data

(60) Provisional application No. 60/690,707, filed on Jun. 15, 2005.

(51) Int. Cl.
*G06F 15/00* (2006.01)

(52) U.S. Cl. .................... 358/1.9; 358/518; 358/504; 399/39

(58) Field of Classification Search ............... 358/1.9
See application file for complete search history.

(56) References Cited

U.S. PATENT DOCUMENTS

| | | | |
|---|---|---|---|
| 5,212,546 A | | 5/1993 | Arazi et al. |
| 5,619,427 A | | 4/1997 | Ohkubo |
| 5,903,796 A | * | 5/1999 | Budnik et al. ............... 399/26 |
| 6,538,770 B1 | | 3/2003 | Mestha |
| 6,690,471 B2 | * | 2/2004 | Tandon et al. ............. 356/420 |
| 6,744,531 B1 | | 6/2004 | Mestha et al. |
| 2002/0093684 A1 | | 7/2002 | Bares et al. |
| 2004/0136013 A1 | * | 7/2004 | Mestha et al. ............. 358/1.9 |
| 2004/0141193 A1 | | 7/2004 | Mestha et al. |
| 2004/0252905 A1 | | 12/2004 | Mizes et al. |
| 2005/0030560 A1 | | 2/2005 | Maltz et al. |
| 2005/0057598 A1 | * | 3/2005 | Endo et al. .................. 347/19 |
| 2005/0099446 A1 | | 5/2005 | Mizes et al. |
| 2008/0037069 A1 | * | 2/2008 | Mestha et al. ............. 358/3.23 |

OTHER PUBLICATIONS

Mestha, L.K.; Viturro, R.E.; Wang, Y.R.; Dianat. S.A.; Gray Balance Control Loop for Digital Color Printing Systems.

Cheng, H; Fan, Z.; Background Identification Based Segmentation and Multilayer Tree Based Representation of Document Images; Proc. IEEE Intl, Conf. on Image Processing, ICIP, Rochester, NY; Sep. 2002.

Fan, Z. et al.; U.S. Appl. No. 10/866,850; Method for Image Segmentation to Identify Regions With Constant Foreground Color; filed Jun. 14, 2004.

(Continued)

*Primary Examiner*—King Y Poon
*Assistant Examiner*—David S Cammack
(74) *Attorney, Agent, or Firm*—Duane C. Basch; Basch & Nickerson LLP

(57) ABSTRACT

The method and system for printer color calibration use a combination of a full-width array (FWA) or similar page-scanning mechanism in conjunction with a spectrophotometer color measurement system in the output path of a color printer for measuring colors with or without requiring any manual operations or operator involvement. The automatic color balance control system produces spatial tonal reproduction values for the primary colors by printing patches, measuring colors using the sensor combination and automatically readjusting the spatial tone reproduction curves until a satisfactory level of printed color accuracy and uniformity are obtained.

22 Claims, 5 Drawing Sheets

OTHER PUBLICATIONS

Mestha et al.; U.S. Appl. No. 10/833,231; Full Width Array Scanning Spectrophotometer; filed Apr. 27, 2004.

Mestha et al.; U.S. Appl. No. 11/016,952; Full Width Array Mechanically Tunable Spectophotometer; filed Dec. 20, 2004.

Mestha et al.; U.S. Appl. No. 10/758,096; Reference Database and Method for Determining Spectra Using Measurements From an LED Color Sensor and Method for Generating a Reference Database; filed Jan. 16, 2004.

Mestha et al.; U.S. Appl. No. 10/248,387; Systems and Methods for Obtaining a Spatial Color Profile and Calibrating a Marking System; filed Jan. 15, 2003.

Mestha et al; U.S. Appl. No. 09/566,291; Online Calibration System for a Dynamically Varying Color Marking Device; file May 5, 2000.

Hunt, R.W.G.; The Reproduction of Color in Photography, Printing and Television; Fourth Edition; Fountain Press; Tolworth, England; 1987; ISBN 0-8524-2356.

Rosenfeld, A.C et al.; Digital Picture Processing; ch. 6; Academic Press 1982.

* cited by examiner

SYSTEM AND METHOD FOR SPATIAL GRAY BALANCE CALIBRATION USING HYBRID SENSING SYSTEMS

This application claims priority from U.S. Provisional Application No. 60/690,707, by R. E. Viturro et al., for a "SYSTEM AND METHOD FOR SPATIAL GRAY BALANCE CALIBRATION USING HYBRID SENSING SYSTEMS", filed Jun. 15, 2005, hereby incorporated by reference in its entirety.

CROSS-REFERENCE TO RELATED APPLICATIONS

Cross-reference is made to related U.S. application Ser. No. 09/566,291 by L. K. Mestha, for an ON-LINE CALIBRATION SYSTEM FOR A DYNAMICALLY VARYING COLOR MARKING DEVICE, filed on May 5, 2000, and U.S. application Ser. No. 11/170,946 by L. K. Mestha et al. for a SYSTEM AND METHOD FOR DYNAMICALLY GENERATED UNIFORM COLOR OBJECTS, filed concurrently herewith, both applications being hereby incorporated by reference for their teachings.

A method and system for printer color calibration are disclosed, and more particularly, a combination of a full-width array (FWA) or similar page-scanning mechanism in conjunction with an spectrophotometer color measurement system in the output path of a color printing system for measuring colors.

BACKGROUND AND SUMMARY

In many business applications, color documents have become essential as a component of communication. Color facilitates the sharing of knowledge and ideas. Companies involved in the development of color output devices continue to look for ways to improve the total image quality of such devices. One of the elements that affects the perception of image quality is an ability to consistently produce the same quality image output on a printer from one day to another, from one week to the next, month after month. Users are accustomed to printers and copiers that produce high quality color and grayscale output. Users further expect to be able to reproduce a color image with consistent quality on any compatible output device, including another device within an organization, a device at home or a device used anywhere else in the world. Hence, there remains a commercial need for efficiently maintaining print color predictability, particularly as electronic marketing has placed more importance on the accurate representation of merchandise in illustrative print or display media.

Description of color, color perception and psychological and physiological phenomena involving light, object and observer, including color measurements using spectrophotometers are described in R. W. G. Hunt, "The Reproduction of Color in Photography, Printing and Television". Fourth Edition, Fountain Press, Tolworth, England 1987 ISBN 0-8524-2356.

It will be appreciated that, in an output image for a color rendering device (e.g., printer, copier or other image output device), good quality process gray provides a strong indication of how well a color rendition process is functioning, and how a printer is operating. Gray balance calibration methodologies are: known as indicated in commonly assigned US Patent Publication 2005/0071104, by Viturro et al. for a METHOD FOR CALIBRATING A MARKING SYSTEM TO MAINTAIN COLOR OUTPUT CONSISTENCY ACROSS MULTIPLE PRINTERS, and pending U.S. application Ser. No. 09/566,291 by L. K. Mestha, for an ON-LINE CALIBRATION SYSTEM FOR A DYNAMICALLY VARYING COLOR MARKING DEVICE, filed on May 5, 2000, both applications being hereby incorporated by reference in their entirety, and they enable printing good quality process gray for single, multiple and tightly integrated parallel printers (TIPP).

Recently filed patent applications, (a) U.S. application Ser. No. 10/833,231 for a FULL WIDTH ARRAY SCANNING SPECTROPHOTOMETER by L. K. Mestha et al., filed Apr. 27, 2004, and (b) U.S. application Ser. No. 11/016,952 for a FULL WIDTH ARRAY MECHANICALLY TUNABLE SPECTROPHOTOMETER, by L. K. Mestha, filed Dec. 20, 2004, cover the use of two different types of full-width array (FWA) spectrophotometers to sense a full page. Both co-pending applications are also hereby incorporated by reference for their teachings. Similarly, U.S. application Ser. No. 10/248,387 for SYSTEMS AND METHODS FOR OBTAINING A SPATIAL COLOR PROFILE, AND CALIBRATING A MARKING SYSTEM, by L. K. Mestha et al., filed on Jan. 15, 2003, and also hereby incorporated by reference, shows an approach that utilizes a specially designed test pattern containing numerous patches, some of which are arranged side by side along the slow scan direction (y-direction) to obtain the gray tonal reproduction curves (TRCs). The remaining patches are organized along the fast scan direction (x-direction) to obtain spatial gray balance TRCs for spatial uniformity correction. A patch target is printed and measured using an in-line or off-line spectrophotometer for obtaining such a gray balance map.

However, such calibration systems and methods do not correct for uniformity defects at a wide range of spatial frequencies, like streaks, bands, "smile/frown", etc. In principle, performing gray balance calibration using full-page information enables the correction of all such defects while maintaining the best uniform process gray a marking engine can produce. Accordingly, the disclosed system and methods utilize a hybrid sensing system to achieve similar results in a readily implemented manner. It will be further appreciated that the hybrid sensing system may be implemented with localized or less than full-width sensing devices, and as such enables the performance of the disclosed calibration process without significant additional cost.

More specifically, the following disclosure is directed to a sensing system comprising a spectrophotometer (e.g., Low Cost Light Emitting Diode (LCLED) spectrophotometer) and the use of uniformity measurements from a full-width array (FWA) scanner bar to measure developability non-uniformity on a photoreceptor or transfer belt. Such devices, in combination, are suitable to provide a printer or similar output device with streak detection and correction capabilities. The spatial mapping algorithms used for this approach form an aspect of this disclosure, and they provide spatial color maps (gray balance TRCs) to achieve color consistency in single printers, in color TIPP configurations, and even among multiple printers.

Obtaining TRCs for a particular color output device or marking engine is a calibration process, which can be constructed by printing predetermined target colors and measuring the printed target colors using in situ color sensors. Predetermined target colors can be printed as chronological jobs in the banner sheet/header sheet and measured either by measuring straight from the output image or by rendering subsets of customer colors as target color patches in banner or header pages. For example, U.S. Pat. No. 6,538,770, issued Mar. 25, 2003 is directed to a control system using dual-mode, banner color test sheets, and is hereby incorporated by reference. Using the target colors and their measured counterparts, and by processing the measured colors, TRCs are adjusted on-line at some desired intervals or on request during system or color balance set ups. Generally, obtaining one-dimensional TRCs is associated with achieving neutral gray balance, where the "grayness" of a color is an indication of how "clean" a process color is, compared to its theoretical ideal. Good gray can be characterized as having zero chroma (that is, $a^*=0=b^*$ on an $L^*a^*b^*$ scale).

When equal amounts of cyan, magenta and yellow marking materials are printed on a white paper, a well balanced printer should produce a neutral gray of the same amount. Often, however, a brownish color is observed rather than a neutral gray. The system will not produce the desired gray due to various limitations on color pigments of the primaries and the internal processes of the print engine. To overcome this effect, gray balanced TRCs are used as one-dimensional look-up tables (LUTs) to modulate the amount of cyan, magenta and yellow proportions depending on the state of the materials and the print engine. The TRCs are obtained by printing large number of patches, mostly near neutral. In the methods practiced by the color reproduction industry, colors are measured using offline spectrophotometers and measured quantities are then modified, generally, by using model based algorithms to produce the desired gray balanced TRCs. Usually this process of printing and producing TRCs is iterated several times until satisfactory results are obtained. This type of approach is time consuming and expensive due to the use of machine models and offline spectrophotometer hardware.

The embodiments disclosed herein include a color printer gray balance method that employs a test target with a small number of patches—that can be made automatic and reliable—to assure color consistency between calibrations for single and multiple machines. Using the information provided by a FWA scanner bar on a spatial area determined by the spatial measurement resolution of the scanner bar on the photoreceptor belt or in the printed sheet the method develops a gray balance map across scan and process direction at the same or higher resolution. The disclosed system and method build on the prior applications referenced above to achieve color consistency using closed feedback loop controls and in-line (or off-line) spectrophotometers for single, multiple and TIPP color printer configurations, and more particularly spatial mapping algorithms and procedures to obtain spatial color maps that can achieve linearization to a gray "axis" for an entire page. This approach can also improve page uniformity by providing compensation for detected streaks and bands.

Accordingly, a method is implemented on a printing or similar output device to spatially gray balance a color printer or similar output device. The method and system employ a hybrid sensing system that combines spectrophotometer sensing with a full page image scanner of FWA. The spectral color is measured by a spectrophotometer, while the two-dimensional reflectance is measured by an image scanner. The latter could be sensed from an image on paper, or possibly toned images on an image belt or drum (e.g., photoreceptor or transfer belt). The methods and associated algorithms produce gray balance tone reproduction curves (TRC) at each spatial location and produce Black TRC for each spatial location.

Disclosed in embodiments herein is a method for spatial gray balance calibration of a color output device, comprising: producing an output image with the device in response to an input signal from a test image, wherein the test image includes at least one preselected color; measuring with a first sensor the image corresponding to the preselected color, said first sensor producing a first output indicating spectral color information for at least the preselected color; producing gray balance TRCs using measurements from at least one preselected color; producing another output image with the device in response to a request, wherein the test image includes at least one preselected color located at a plurality of spatial locations in the test image; measuring with a second sensor the image at preselected spatial location(s) corresponding to the preselected color, said second sensor producing a second output indicating reflectance information for at least the preselected color at the plurality of spatial locations; determining an error between the measured color of the one preselected color at a preselected pixel location (or an average of a block of pixels in the preselected spatial region of the preselected color) and using the color information and the reflectance information at other pixel locations (or blocks containing multiple pixels) adjusting the gray balance tone reproduction curves (TRCs) of the device to minimize the spatial uniformity errors at all pixel locations, thus calibrating the device color output spatially, whereby the device expeditiously produces pleasing uniform color.

Also disclosed in embodiments herein is a color output device including a calibration system for spatial gray balance of an output image, the system comprising: a front end converter for converting an input signal representative of a target image comprising a preselected color into a device-dependent control signal in accordance with a device TRC; a color marking engine, responsive to the device-dependent control signal, for generating a marked image in response thereto at a plurality of spatial locations; a first sensor for measuring the marked image corresponding to the preselected color, said first sensor producing a first output indicating spectral color information for at least the preselected color; a second sensor for measuring the marked image at preselected spatial location(s) corresponding to the preselected color, said second sensor producing a second output indicating reflectance information for at least the preselected color; and a controller for producing gray balance TRCs using measurements from at least one preselected color, producing another output image with the device, wherein the test image includes at least one preselected color, and determining an error between the measured color of the one preselected color at a preselected pixel location (or an average of a block of pixels in the preselected spatial region of the preselected color) and using the color information at other pixel locations (or blocks containing multiple pixels) constructing the gray balance TRCs for the device to minimize spatial uniformity errors at all pixel locations, thus calibrating the device color output spatially, whereby the device expeditiously produces pleasing uniform color.

Another disclosed feature of the embodiments herein is a color output device, comprising: a source of printable substrates, said source operatively connected to a printing engine, said printing engine producing an output image with the device in response to an input signal from a test image, wherein the test image includes at least one preselected color; a spectrophotometer, said spectrophotometer measuring the image corresponding to the preselected color, said spectrophotometer producing a first output indicating spectral color information for at least the preselected color; a controller for producing gray balance tone reproduction curves using measurements from at least one preselected color, and producing a second output image with the device in response to a request, wherein the second output image includes at least one preselected color located at a plurality of spatial locations in the test image; and a reflectance scanner for sensing a developed color region of the second output image at a preselected spatial location corresponding to the preselected color, said reflectance scanner producing a second output indicating reflectance information for at least the preselected color at the plurality of spatial locations; said controller determining an error between the measured color of the preselected color at a preselected pixel location and, using the color information and the reflectance information at other pixel locations, adjusting the gray balance tone reproduction curves of the device to minimize the spatial uniformity errors at all pixel locations, thereby calibrating the device color output spatially.

DETAILED DESCRIPTION

Figure 1:
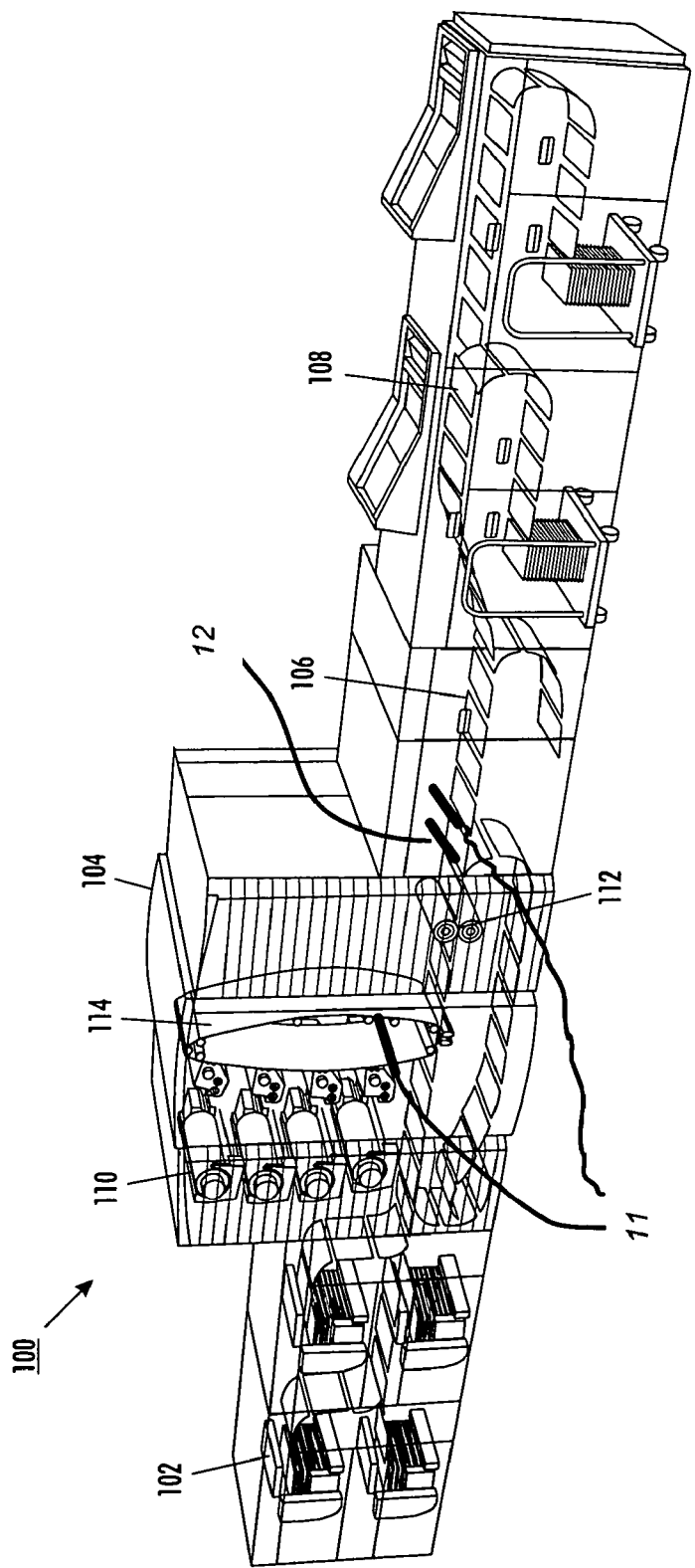
FIG. 1 is an exemplary mechanical embodiment for the disclosed system and method which includes in-line full width array scanner and spectrophotometer.

The system and method will be described in connection with a preferred embodiment, however, it will be understood that there is no intent to limit the scope to the embodiment(s) described. On the contrary, the intent is to cover all alternatives, modifications, and equivalents as may be included within the spirit and scope of the appended claims. Referring now to the drawings, the figures show a method and apparatus for automatically calibrating a printing or similar output device.

The method and system use a combination of a full-width array (FWA) or similar page-scanning mechanism in conjunction with an on-line spectrophotometer color measurement system in the output path of a color printer for measuring colors (e.g., on printed test sheets, banner/separation pages, etc.) without requiring any manual operations or operator involvement. The automatic color balance control system produces tonal reproduction values for all four of the primary colors by printing patches, measuring colors and automatically readjusting the tone reproduction curves until a satisfactory level of accuracy is obtained. While producing color balanced TRCs, the system will automatically lock the printer output to some predetermined color patch targets. In one particular preferred embodiment, this output is locked to neutral gray when target colors are set to neutral gray inside the digital front end (DFE). After converging to the targets, the control system will return full TRCs for use inside the normal print path. The process is enabled either by the system controller or by a user with minimal interaction.

A physical implementation of this controller is depicted in FIG. 1, which shows the Xerox iGen3™ 110 Digital Production Press, a printer or similar output device 100 providing a xerographic printing system suitable for practicing the method disclosed herein. Printer 100 includes a source of paper or printable substrates 102 that is operatively connected to a printing engine 104, and output path 106 and finisher 108. As illustrated, the print engine 104 is a multi-color engine having a plurality of imaging/development subsystems 110, that are suitable for producing individual color images (e.g., CMYK) on belt 114, where the belt then transfers the images to the substrate.

Figure 2:
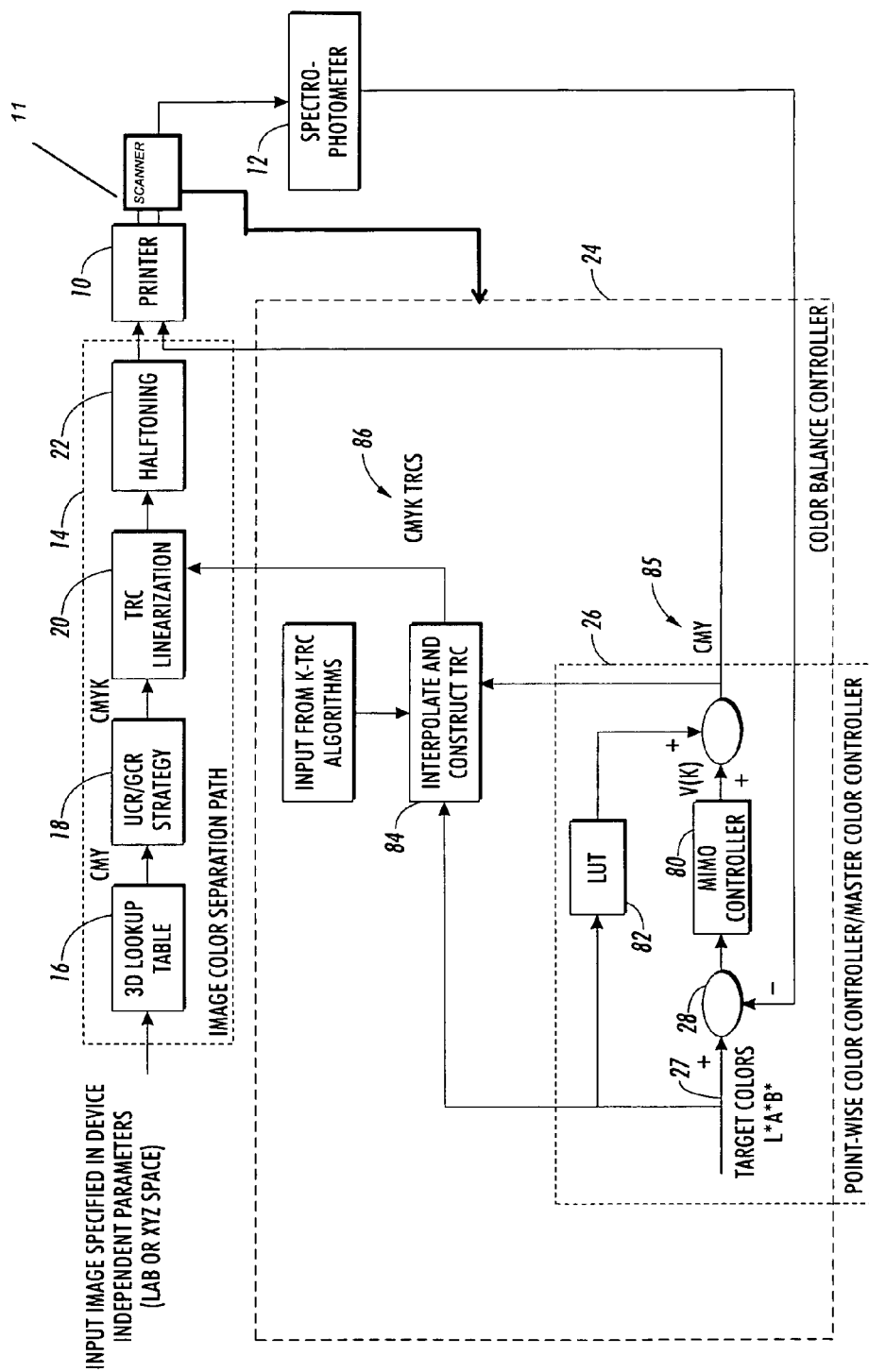
FIG. 2 depicts a functional flowchart of the spectrophotometer & scanner based hybrid calibration system and subsequent functions executed by the gray balance controller.

FIG. 2 depicts a block diagram representation of the overall system providing an embodiment for operation of the disclosed method. The printer specified in the system comprises a marking device 110 (such as subsystems 110 in FIG. 1), with an associated reflectance scanner 11 for sensing reflectance of a developed color region or patch. In one embodiment, scanner 11 may be an on-line full-width array scanner associated with a document path. Alternatively, as depicted in FIG. 1, scanner 11 may be a scanning array adjacent to a photoconductive or intermediate transfer medium, where the reflectance of a toner or similar marking material patch may be sensed. In other embodiments, scanning array 11 may be located on the output path 106, where the reflectance of the fused toner or similar marking material patch may be sensed. Marking device 110 further comprises a color sensing device 12, although the system and method are not restricted to marking devices alone and any image output/display system such as printers, monitors or other imaging devices may employ aspects of the disclosed system and method. It will be further appreciated that the signals produced by the aforementioned sensors may be the result of sensing operations performed on different portions of a document or printed page, as well as on different pages. In other words, the spectrophotometer receives input from one page while the reflectance scanner receives input from a different page or another location (photoreceptor or belt) in the system.

In the depicted embodiment, the color sensing device 12 is a spectrophotometer. The spectrophotometer provides spectral information comprising a representative signal of the printed colors of the image and preferably comprises L*, a*, b* values, XYZ, etc., values depending on the desired color description. One such spectrophotometer may be that disclosed in U.S. Pat. No. 6,384,918 by Hubble, III et al. for a SPECTROPHOTOMETER FOR COLOR PRINTER COLOR CONTROL WITH DISPLACEMENT INSENSITIVE OPTICS, the disclosure of which is hereby incorporated by reference. The spectrophotometer is for non-contact measurement of colored target areas such as test patches on moving printed test sheets in an output path of a color printer, where test patches may be sequentially angularly illuminated with multiple different colors, and a photosensor providing electrical signals in response. The spectrophotometer includes a lens system for transmitting that reflected illumination (multiple illumination sources comprise approximately ten or more individual LEDs) from the test patch to the photosensor with a lens magnification ratio of approximately one to one. The exemplary spectrophotometer provides non-contact color measurements of moving color target areas variably displaced therefrom within normal paper-path baffle spacings.

The digital front end (DFE) 14 controls the rendering of images in the printer 100 and comprises a conventional image color separation path for processing an input image, as specified in device independent parameters, into CMYK printing parameters acceptable for rendering by the printer 10. A three-dimensional (3-D) look-up table (LUT) 16 transforms the original image in device independent space (e.g., LAB) to CMY space. The CMY space is transformed to CMYK space by undercolor removal/gray component replacement 18. Linearization of the Tonal Reproduction Curve (TRC) 20 comprises a calibration and characterization process that is the subject of the present disclosure. The particular linearized signal resulting from the TRC is converted into a halftone imaging before actual printing by the marking device 10.

In many cases, raster image processing (RIPping) of the images is carried out off-line and at the time of printing and the color balance can be achieved by merely adjusting the TRCs of the pre-RIPped images. It is a feature of the present system and method to achieve a particular output image color balance, and therefore more accurate output printing, by producing color-balanced, spatial TRCs at convenient and desirable times (typically during preset intervals like the beginning of a job or throughout long jobs as periodically needed to maintain accuracy) to ensure that the requested colors can be produced. These TRCs are generated by printing mixed color patches of specified target patches that are neutral, instead of printing patches with primary colors—CMYK. The RIPped image can then be processed with color balanced TRCs easily inside the DFE 14 for facilitating the use of reprinting RIPped jobs without going through a costly and time consuming re-RIPping process.

With continued reference to FIG. 2, the processing system comprises a Color Balance Controller 24 for carrying out the methodology described herein and for constructing spatial calibration TRCs. The method disclosed below is carried out by a processor(s) within controller 24 to spatially gray balance (GB) the color printer 10 using a hybrid sensing system consisting of the inline spectrophotometer 12 and a scanner array 11. The spectral color information is measured by the in-line spectrophotometer 12, whereas the spatial, 2-D reflectance is measured by the scanner 11 on, for example, a photoreceptor belt or perhaps an intermediate transfer belt.

Figure 3:
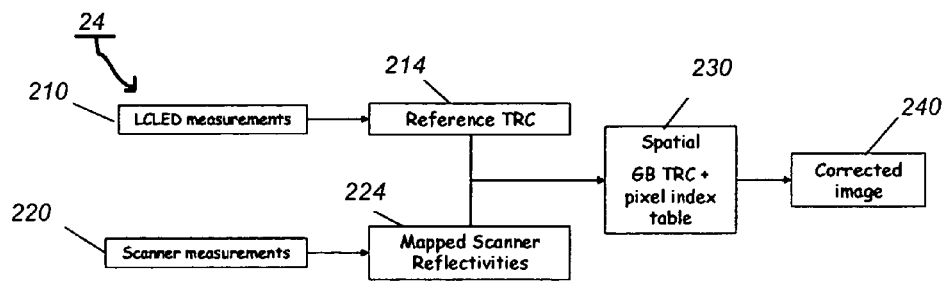
FIG. 3 depicts a flow diagram representation of the overall hybrid system providing an embodiment for operation of the disclosed method.

Referring also to FIG. 3, which further depicts one of several possible functions of controller 24, the figure is a data flow diagram generally illustrating a procedure for constructing and actuating the special TRCs using the in-line spectrophotometer and scanner devices. In one embodiment, the nominal spatial gray balance targets comprise a plurality of gray values printed as test patches (approximately twenty two patches), which is an area over which the sensor can make accurate measurements—each printed at a particular spatial location on a full page if different test pages are used for measurements with spectrophotometer and scanner devices, or the same test pages when two measurement systems can be instrumented to measure and scan appropriate regions of the test area sequentially one after another. A particular area of the page, located at position $(i_0, j_0)$, for example in a central region of the page, is measured using a spectrophotometer such as the LCLED in-line sensor, to produce the LCLED Measurements 210. The scanner captures the spatial measurement of one or more uniform gray values (e.g., twenty or more gray values used in the gray balance targets based on the system requirements) printed on a same or different test sheets at a particular resolution, e.g., 600×600, 600×300, etc, as represented by scanner measurements 220. For position $(i_0, j_0)$, the spectral values are used to compute the $L^*a^*b^*$ values of the gray patches, namely $[L^*_{0,0}\ a^*_{0,0}\ b^*_{0,0}]$, and $L^*a^*b^*$ values of the gray patches. With measurements from all gray levels (e.g., 22 levels), reference gray balance TRCs, 214, are constructed. Reflectivity (R) values of the uniform gray area are scanned spatially, including the position $(i_0, j_0)$. In other words, R ($\equiv L^*$), or RGB values for the case of the color scanner bar. If the scanner bar is used to sense the reflectivity values from the paper, then full RGB or subsequently calculated $L^*a^*b^*$ values from the scanner are used to create the spatial error vectors. Error vectors are created for each gray level(s) and each pixel, or block of pixels between coordinates (0,0) to (i,j) for all positions of the page, by comparing the reflectivity values of the scanner measurements at various spatial locations to its measurements at the position $(i_0, j_0)$, which provides a set of spatial corrections $\{\Delta E\}$ between coordinates (0,0) to (i,j). As used herein, the term pixel may be understood to include both individual pixels as well as an average of a block of pixels in a preselected spatial region of a color. In some situations, if the scanner is well calibrated to a spectrophotometer, error vectors can also be obtained by comparing the spectrophotometer measurements at position (0,0) to the scanner measurements at coordinates (i,j). It is not essential that the measurement area of the test page for the spectrophotometer system be the same as the measurement area of the scanner device since these devices could have varying measurement apertures.

Next, as illustrated in FIGS. 2 and 3, the output of the spectrophotometer and the scanner are then passed for further processing. Controller 24 uses the reference TRCs (214) and scanner reflectivities 224 to map $\{\Delta E\}$ between coordinates (0,0) and (i,j) to $\{\Delta CMYK\}$ between (0,0) and (i,j), which is used to construct the spatial gray balance 4×256 TRC and index LUTs, as represented by operation 230. Although described herein relative to an automated system and process that may be accomplished with little or no manual intervention, it will also be appreciated that aspects of the disclosed method may be performed manually to achieve the same or similar results.

Also understood is that the system implements a 1-D gray balance procedure to extract TRC from patches using inputs representing the target colors, which is also fed to a look-up table. This look-up table could be an approximate inverse of the printer (i.e., $L^*, a^*, b^* \rightarrow CMY$) or simply $L^*=C=M=Y$. Using the output of the look-up table, first prints of the patches are made, and at a summing node the input target values are compared to the measured colors to obtain an error. The error signal representing the difference between the desired target colors and the output colors is fed as an output to a gain matrix K within the controller 26, and then that output is processed through an integrator, which integrates the weighted errors and outputs corrections to the value that is the output from the look-up table. The 1-D gray balance has been studied through experimental and simulation results, performed under a wide variety of conditions.

The method employs a simple algorithm for mapping a nominal gray balance TRC across the scan and process directions at the predetermined spatial resolution. The algorithm may be described relative to two steps. First, obtaining CMY gray balance TRCs to follow a suitable aim or desired curve. The second step is linearizing the black separation at each spatial location. The following algorithm may be employed to produce gray balance TRCs at each spatial location.

A preset number of gray values are used as control nodes while constructing the reference gray balance TRCs (e.g., twenty two gray values for building CMYK TRCs). At each control node the following equation (Eq. 1) produces the CMY values. Generally, ten to fifteen control nodes separated along the tonal reproduction curve are considered sufficient for producing the desired CMY gray balance TRCs. Remaining nodes are used for constructing K (black)—TRCs.

$$\begin{bmatrix} C \\ M \\ Y \end{bmatrix}_{(0,0,g)new} = \begin{bmatrix} k_{11} & k_{12} & k_{13} \\ k_{21} & k_{22} & k_{23} \\ k_{31} & k_{32} & k_{33} \end{bmatrix}_{(g)} \begin{bmatrix} \Delta L^* \\ \Delta a^* \\ \Delta b^* \end{bmatrix}_{(0,0,g)} + \begin{bmatrix} C \\ M \\ Y \end{bmatrix}_{(0,0,g)old} \quad \text{Eq. 1}$$

Where subscript (0, 0, g) represents the particular area located at position ($i_0$, $j_0$) and the subscript letter 'g' represents the gray value for the corresponding spatial location. In Eq. 1, matrix containing elements $k_{11}$, $k_{12}$, . . . , $k_{33}$ represents the gain values used in the gray balance loop inside the gain matrix. The delta values $\Delta L^*$, $\Delta a^*$, $\Delta b^*$, are the differences between the measured L*a*b* values from the LCLED sensor to the aim L*a*b* values for gray patches. The elements inside the gain matrix are obtained by knowing the sensitivity matrix, say B (in Eq. 5 shown below), between input gray values of CMY separation to the L*a*b* values and applying pole-placement or other control algorithms described in feedback control literature. More simply, the gain matrix can also be obtained by using the equation: $K = \sigma B^{-1}$ for values of $0 \leq \sigma \leq 1$. A preferred value of $\sigma$ for this application is approximately 1. In Eq. 1, the "new" subscript refers to the CMY values obtained after completing the iteration, and corresponding CMY values are used for constructing the CMY gray balance TRCs.

Let $\delta L^*$ be the error table between the pixel coordinates (0, 0) and pixel area (i, j). The errors between a* and b* values are ignored for the purpose of illustrating the use of this method with measurements from the scanner bar on the belt. When measurements of scanned data from the paper are used, the error table can be the corresponding errors between L*,a*, and b* values. Also, it should be noted that when the belt measurements are used, actual L* from the scanner may be further scaled using a nonlinear correlation function between belt measurements to paper measurements shown in FIG. 5. Then, $$\delta L^*(i,j,g) = l^*(i,j,g) - L^*(0,0,g), \quad \text{Eq. 2}$$

Using Eq. 2, CMY values of Eq. 1 can be modified to obtain the mapped CMY values at each spatial pixel area, (i, j). The mapping algorithm uses a 3×3 projection operator matrix with elements described by the matrix P as follows:

$$\begin{bmatrix} C \\ M \\ Y \end{bmatrix}_{(i,j,g)} = \begin{bmatrix} p_{11} & p_{12} & p_{13} \\ p_{21} & p_{22} & p_{23} \\ p_{31} & p_{32} & p_{33} \end{bmatrix}_{(g)} \begin{bmatrix} \delta L^* \\ 0 \\ 0 \end{bmatrix}_{(i,j,g)} + \begin{bmatrix} C \\ M \\ Y \end{bmatrix}_{(0,0,g)} \quad \text{Eq. 3}$$

Or, in compact format:

$$\Delta X_{i,j,g} = P_{m,1,g} \times \delta L_{i,j,g} + \Delta X_{0,0,g} \quad \text{Eq. 4}$$

where m=1, 2, 3, for X=C, M, Y, respectively, and $X_{0,0}$ is given by Eq. 1. The projection matrix, P, gives a vector space projection by permuting the measured error vector at each pixel location to a space covered by the CMY vector. For one embodiment, the projection matrix can be obtained simply by taking an inverse of the sensitivity matrix (Jacobean) shown below for a given gray value:

$$P = B^{-1}, \text{ where } B = \begin{bmatrix} \frac{\delta L^*}{\delta C} & \frac{\delta L^*}{\delta M} & \frac{\delta L^*}{\delta Y} \\ \frac{\delta a^*}{\delta C} & \frac{\delta a^*}{\delta M} & \frac{\delta a^*}{\delta Y} \\ \frac{\delta b^*}{\delta C} & \frac{\delta b^*}{\delta M} & \frac{\delta b^*}{\delta Y} \end{bmatrix}, \quad \text{Eq. 5}$$

The projection matrix can also be obtained by extracting the sensitivity of the printer using nonlinear printer models.

Next, the algorithm for producing black TRCs at each spatial location is described. For black separation, Equations 1 and 3 are modified to a non-matrix equation, since they require only L* correction.

$$[K]_{(0,0,g)new} = [k]_{(g)}[\Delta L^*]_{(0,0,g)} + [K]_{(0,0,g)old} \quad \text{Eq. 6}$$

$\delta L^*(i, j, g)$ represents the difference between L* values at the pixel location (0, 0) to location (i, j) for a given black gray image specified by its gray value, 'g', and is calculated using Eq. 2. In Eq. 6, 'k' represents the gain values used for the black separation, which is also obtained using a pole placement algorithm or using $k = \sigma b^{-1}$ for values of $0 \leq \sigma \leq 1$, where $b = \partial K / \partial L^*$ the sensitivity of black separation at a given gray value. Again, a preferred value of $\sigma$ for this application is approximately 1.

$$[K]_{(i,j,g)} = [p]_{(g)}[\delta L^*]_{(i,j,g)} + [K]_{(0,0,g)} \quad \text{Eq. 7}$$

In Eq. 7, 'p' represents the scalar values used for black separation. The preferred value of 'p' is $b^{-1}$. Thus the linear matrix equation, Eq. 3, represents the new CMY values, mapped to the location (i, j) based on scanner measurements. By repeating Eq. 3 at different gray values (g) and using interpolation and smoothing techniques gray balance TRCs for a given pixel region can be easily obtained. Similarly, TRC smoothing algorithms are used to construct the final mapped K-TRC for black separation.

Figure 4:
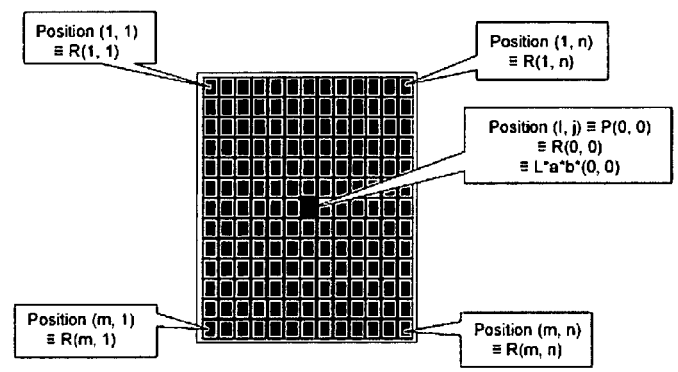
FIG. 4 is an exemplary representation of a portion of an image to illustrate the spatial relationships.

The maximum number of pixels along the scan and process direction can be determined by the scanner resolution and any adequate hardware limitation. FIG. 4 shows a schematic illustrating the grid and reference values. The simulations used a grid 62×47 dpi (11" side divided into 62 pixels and 8.5" divided into 47 pixels), but the method can be extended to the resolution of the scanning bar used in the measurements.

Figure 5:
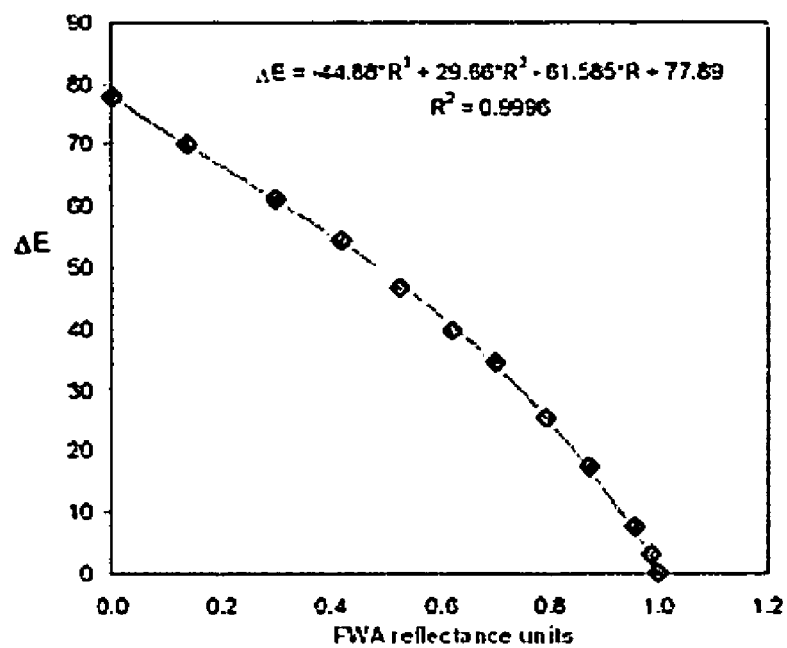
FIG. 5 is a graph depicting the correlation between FWA measurements of reflectance on a photoreceptor belt and spectrophotometric ($\Delta E$) measurements on prints for several area coverages.

One embodiment measures, on paper, the $L^*_{0,0}$ $a^*_{0,0}$ $b^*_{0,0}$ values using an in-line spectrophotometer, e.g., LCLED, and the 2-D reflectivity values using either a monochrome or a color scanner bar. Another embodiment determines, on paper only, the $L^*_{0,0}$ $a^*_{0,0}$ $b^*_{0,0}$ values, and measures the 2-D reflectivity values using either monochrome or a color scanner bar on a P/R belt (e.g., iGen) or on the image transfer belt or web. These methodologies depend on the correlation between $\Delta E$ (paper) and scanner reflectivity measurements on a belt. Yet another embodiment determines, on paper only, the $L^*_{0,0}$ $a^*_{0,0}$ $b^*_{0,0}$ values as measured by an accurate spectrophotometer, and measures the 2-D reflectivity values using either monochrome or a color scanner bar on paper. Experimental results for the correlation between the scanner P/R belt reflectivities and the $\Delta E$ function from paper are shown in FIG. 5 for cyan prints. The correlation exists for other color separations also. From the experimental correlation the values of L*(j, k) are obtained, and used in Eq. 2.

Figure 6:
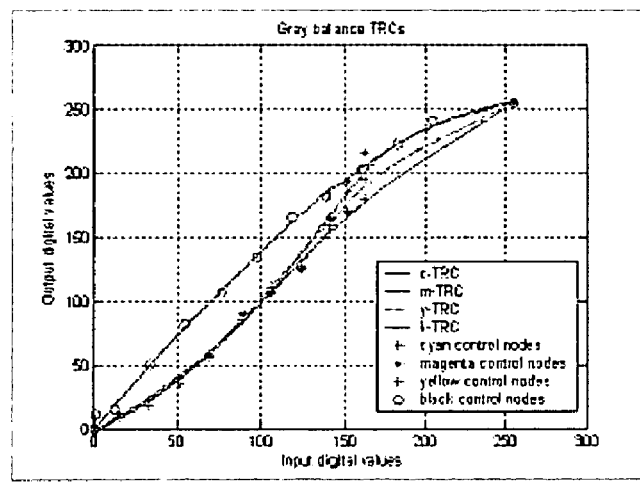
FIG. 6 show the nominal CMYK gray balance TRCs for an exemplary system.
Figure 7:
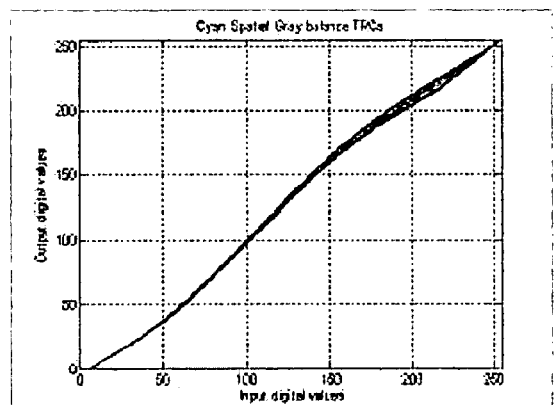
FIGS. 7, 8 and 9 show, respectively, the spatial gray balance TRCs for Cyan, Magenta and Yellow separations obtained using the disclosed method for an exemplary system.
Figure 8:
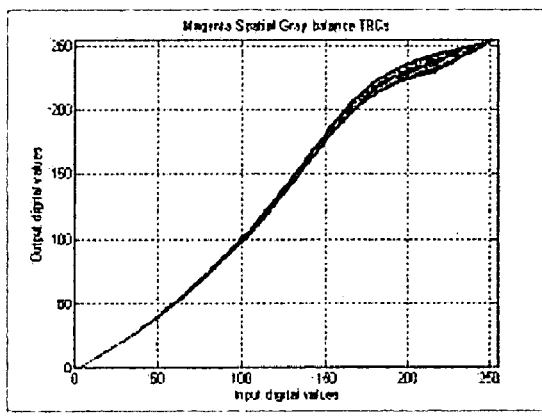
Figure 9:
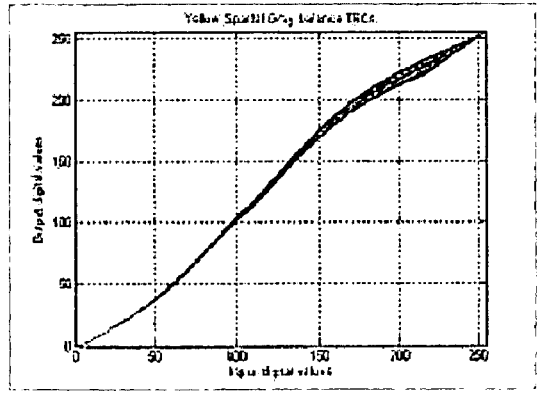

FIG. 6 show the nominal gray balance TRCs for CMYK separations. FIGS. 7, 8, and 9 show the spatial gray balance TRCs for CMY separations obtained using the above algorithm, Equations 1-6, and a Xerox iGen printer. The process employed a grid of 62×47 on the 11"×8.5" image. The gray images were printed at different control nodes and scanned using an Epson™ GT30000 scanner at 600 dpi scanning resolution. The lower resolution grid was obtained by averaging 100×100 pixel squares. For the purpose of testing, the 200 pixel wide blocks were truncated around the edges of the gray images to discount for any registration errors in the scanner measurement.

Furthermore, the disclosed method can also be implemented using 2D or 3D calibration schemes, but these require additional pages produced with other colors and a new projection matrix at those color values. Present method and system are believed to extend the gray balance calibration methodology and color consistency methods using closed loop feedback controls to include spatial variability of the color over the entire page. The procedure can be implemented in single printers, in color TIPP configurations, and also assures color consistency among multiple printers. Periodic updates of the gray balance of each printer guarantees color consistency for long runs. The disclosed procedure for inline gray balance is not only automatic (may be carried out in response to a user or technician selecting the operation on a graphical user interface associated with the DFE), so as to be easily performed by non-skill labor force, but is also efficient so as to require little time to complete the calibration process. The extension of the testing to spatial gray balance TRCs can then be performed automatically using the inline scanner.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for gray balance calibration of a color output device, comprising:
    producing first output image with the device in response to an input signal from a test image, wherein the first test image includes at least one preselected color;
    measuring with a first sensor the image corresponding to the preselected color, said first sensor producing a first output indicating spectral color information for at least the preselected color; producing gray balance tone reproduction curves using measurements from at least one preselected color;
    producing a second output image with the device in response to a request, wherein the second test image includes at least one preselected color located at a plurality of spatial locations in the second test image;
    measuring with a second sensor the image at preselected spatial locations corresponding to the preselected color of the second output image, said second sensor producing a second output indicating reflectance information for at least the preselected color at the plurality of spatial locations;
    determining an error between the measured color of the one preselected color at a preselected pixel location and using the color information and the reflectance information at other pixel locations;
    adjusting the gray balance tone reproduction curves of the device to minimize the spatial uniformity errors at all pixel locations, thus calibrating the device color output spatially whereby the device expeditiously produces pleasing uniform color.

2. The method of claim 1, wherein the preselected pixel location is an average of a block of pixels in the preselected spatial region of the preselected color.

3. The method of claim 1 wherein measuring with the first and second sensors occurs during real time operation of the device.

4. The method of claim 3, wherein adjusting a tone reproduction curve is accomplished for at least two of said spatial locations, and where said tone reproduction curve includes control points for each of said spatial locations.

5. The method of claim 1, wherein said second sensor is located adjacent a photoconductive surface having a developed image thereon, and where producing the second output indicating reflectance information is the result of sensing the reflectance of the photoconductive surface.

6. The method of claim 1 wherein adjusting includes recursively determining the error until the error is less than a predefined value.

7. The method of claim 4 wherein adjusting the gray balance TRCs includes interpolating at least one uncontrolled point between the control points.

8. The method of claim 1 wherein the preselected colors include neutral grays.

9. The method of claim 1 wherein a common output image includes the first and second test images, and where measuring with the first and second sensors occurs sequentially using the common output image.

10. A color output system including a calibration system for dynamic color balance control of an output image, the system comprising:
    a front end converter for converting an input signal representative of a target image comprising a preselected color into a device-dependent control signal in accordance with a device TRC;
    a color marking engine, responsive to the device-dependent control signal, for generating a marked image in response thereto at a plurality of spatial locations;
    a first sensor for measuring the marked image corresponding to the preselected color, said first sensor producing a first output indicating spectral color information for at least the preselected color;
    a second sensor for measuring the marked image at preselected spatial locations corresponding to the preselected color, said second sensor producing a second output indicating reflectance information for at least the preselected color; and
    a controller for producing gray balance TRCs using measurements from at least one preselected color, producing another output image with the device, wherein the test image includes at least one preselected color, and determining an error between the measured color of the image for the at least one preselected color at a preselected pixel location and using the color information at other pixel locations constructing the gray balance TRCs for the device to minimize spatial uniformity errors at all pixel locations, thus calibrating the device color output spatially whereby the device expeditiously produces pleasing uniform color;
    whereby subsequently generated output images are output with the adjusted device TRC and, more accurately represent target input images.

11. The system of claim 10 wherein the controller further constructs the TRCs with uncontrolled points estimated from the control points.

12. The system of claim 10 wherein the first and second sensors are disposed in-line for real time adjustment of the device TRC.

13. The system of claim 10 wherein the preselected color comprises a neutral gray.

14. The system of claim 10, wherein said controller adjusts the tone reproduction curve for at least two of said spatial locations, and where said tone reproduction curve includes control points for each of said spatial locations.

15. The system of claim 10, wherein said second sensor is located adjacent a photoconductive surface having the marked image thereon, and where producing the second output indicating reflectance information is the result of sensing the reflectance of the photoconductive surface in the region of the marked image.

16. The system of claim 10, wherein said second sensor is located adjacent an intermediate transfer surface having a marked image thereon, and where the second output indicating reflectance information is the result of sensing the reflectance of the transfer surface.

17. The system of claim 10, wherein said controller iterates the printing and sensing operations and recursively determines the error until the error is less than a predefined value.

18. The system of claim 12, wherein the marked image includes first and second test images on a common substrate, and where measuring with the first and second sensors occurs sequentially using the marked image on the common substrate to generate, respectively, the first output indicating spectral color information and the second output indicating reflectance information.

19. A color output device, comprising:
- a source of printable substrates, said source operatively connected to a printing engine, said printing engine producing an output image with the device in response to an input signal from a test image, wherein the test image includes at least one preselected color;
- a spectrophotometer, said spectrophotometer measuring the image corresponding to the preselected color, said spectrophotometer producing a first output indicating spectral color information for at least the preselected color;
- a controller for producing gray balance tone reproduction curves using measurements from at least one preselected color, and producing a second output image with the device in response to a request, wherein the second output image includes at least one preselected color located at a plurality of spatial locations in the test image;
- a reflectance scanner for sensing a developed color region of the second output image at a preselected spatial location corresponding to the preselected color, said reflectance scanner producing a second output indicating reflectance information for at least the preselected color at the plurality of spatial locations;
- said controller determining an error between the measured color of the preselected color at a preselected location and, using the color information and the reflectance information at other locations, adjusting the gray balance tone reproduction curves of the device to minimize the spatial uniformity errors at all locations, thereby calibrating the device color output spatially.

20. The device of claim 19, wherein said reflectance scanner is located adjacent a photoconductive surface having a developed image thereon, and where producing the second output indicating reflectance information is the result of sensing the reflectance of the photoconductive surface.

21. The device of claim 19, wherein said reflectance scanner and said spectrophotometer are located in an output path of the device.

22. The device of claim 19, wherein said controller adjusts the tone reproduction curve for at least two of said spatial locations, and where said tone reproduction curve includes control points for each of said spatial locations.

* * * * *